United States Patent
Ng

(10) Patent No.: US 8,644,769 B2
(45) Date of Patent: Feb. 4, 2014

(54) POWER USAGE MANAGEMENT OF WIRELESS INPUT DEVICES

(75) Inventor: Chern Ann Ng, Singapore (SG)

(73) Assignee: Razer (Asia-Pacific) Pte Ltd (SG)

( * ) Notice: Subject to any disclaimer, the term of this patent is extended or adjusted under 35 U.S.C. 154(b) by 1065 days.

(21) Appl. No.: 12/035,579

(22) Filed: Feb. 22, 2008

(65) Prior Publication Data

US 2009/0215402 A1 Aug. 27, 2009

(51) Int. Cl.
- *H04B 1/00* (2006.01)
- *H04B 1/38* (2006.01)
- *H04B 1/16* (2006.01)
- *G06F 1/32* (2006.01)
- *G06F 1/00* (2006.01)
- *G09G 5/00* (2006.01)
- *G09G 5/08* (2006.01)

(52) U.S. Cl.
USPC ............ 455/69; 455/574; 713/320; 713/300; 345/156; 345/166

(58) Field of Classification Search
USPC ................. 455/69, 574, 343.1; 713/320, 300; 345/156, 166
See application file for complete search history.

(56) References Cited

U.S. PATENT DOCUMENTS

| | | | | |
|---|---|---|---|---|
| 7,055,047 | B2* | 5/2006 | Wortel et al. | 713/320 |
| 7,228,102 | B2* | 6/2007 | Gordon | 455/19 |
| 2001/0033267 | A1* | 10/2001 | Kim et al. | 345/156 |
| 2004/0113890 | A1* | 6/2004 | Ranta | 345/166 |
| 2008/0261696 | A1* | 10/2008 | Yamazaki et al. | 463/39 |

* cited by examiner

*Primary Examiner* — Christopher M Brandt
*Assistant Examiner* — Muthuswamy Manoharan
(74) *Attorney, Agent, or Firm* — Axis Intellectual Capital Pte Ltd

(57) ABSTRACT

Input devices such as computer mice are commonly used for interacting with personal computers (PCs). Increasingly, wireless computer mice are becoming popular with users due to their ability to provide cordless accessibility for interaction with the PCs. The wireless computer mice are usually powered using batteries and uses radio frequencies (RF) for transmitting the users' input to the PCs. The wireless computer mice usually have a fixed transmission power, thus resulting in a fixed transmission range. Notably, the battery life and transmission range of the wireless mice share an inversely proportional relationship. Hence, a long battery life cannot be obtained without decreasing the transmission range and vice versa. However, existing wireless computer mice typically do not have provisions for making such adjustments. An embodiment of the invention describes an apparatus and a method for managing power usage of wireless input devices.

34 Claims, 4 Drawing Sheets

| Software Application | |
|---|---|
| Adjust rate of power consumption: | |
| Remaining battery life: | |
| Adjust transmission range: | |
| Current transmission range: | |

POWER USAGE MANAGEMENT OF WIRELESS INPUT DEVICES

FIELD OF INVENTION

The invention relates generally to human interface devices for computers. In particular, the invention relates to a wireless input device with means for varying between battery life and wireless operating range of the wireless input device.

BACKGROUND

Input devices such as computer mice are commonly used for interacting with personal computers (PCs). While the majority of the computer mice are connected directly to the PCs' peripheral inputs via a cord and powered through the cord, wireless computer mice (hereinafter referred to as wireless mice) are becoming extremely popular in providing users with cordless accessibility for interaction with PCs. Due to the absence of a cord, the wireless mice are typically powered using disposable or rechargeable batteries such as AA-size batteries.

Wireless mice usually communicate with the PCs via radio frequencies (RF) communication. In order to establish RF communication, an RF transmitter and an RF receiver are required. The RF transmitter is usually integrated within the wireless mouse whereas the RF receiver is typically coupled to the PC. The RF transmitter transmits signals from the wireless mouse to the RF receiver. Examples of such signals include button clicking of the wireless mouse or displacements of the wireless mouse relative to a working surface such as a surface of the desktop. Upon receiving the transmitted RF signals, the RF signals are then decoded by the PC to obtain information contained in the RF signals.

Wireless mice are usually made available with a maximum transmission range pre-determined by the transmission power of the wireless mice. The transmission power of the wireless mice is typically fixed, thus resulting in a fixed transmission range. Therefore, using a wireless mouse with a long transmission range capability for short-range usage would result in unnecessary increased power consumption from the battery that powers the wireless mouse. However, using a wireless mouse with a short transmission range capability to curb power consumption of the battery would mean that the wireless mouse cannot be used in a position that is out of reach of the receiving range of the RF receiver which then in turn hampers user mobility when longer range usage of the wireless mouse is required.

Hence, in view of the foregoing problems, there affirms a need for an apparatus and a method for allowing power usage management of wireless input devices.

SUMMARY

Embodiments of the invention disclosed herein provide an apparatus and a method for managing power usage of wireless input devices.

In accordance with a first aspect of the invention, there is disclosed a wireless input device communicable with a processor-based device. The wireless input device comprises a transducer, a transceiver and a controller. The transducer is operable for generating instruction data. The transceiver transmits the instruction data as instruction signals for reception by the processor-based device. The instruction signals have a signal strength in which the signal strength determines the transmission range of the instruction signals. The transceiver further receives control signals from the processor-based device. The controller controls the transceiver. In addition, the controller controls the signal strength and consequently the transmission range of the instruction signals based on control data contained in the received control signals. The signal strength of the instruction signals is controlled by controlling rate of power consumption from a battery module and the battery module powers the transceiver.

In accordance with a second aspect of the invention, there is disclosed a power usage management method for a wireless input device communicable with a processor-based device. The method comprises receiving control signals from the processor-based device by the wireless input device. The wireless input device comprises a transducer and a transceiver. The transducer is operable for generating instruction data. The transceiver transmits the instruction data as instruction signals for reception by the processor-based device. The instruction signals have a signal strength in which the signal strength determines the transmission range of the instruction signals. The transceiver further receives the control signals from the processor-based device. The signal strength and consequently the transmission range of the instruction signals are controllable based on control data contained in the received control signals. The signal strength of the instruction signals is controlled by controlling rate of power consumption from a battery module and the battery module powers the transceiver.

In accordance with a third aspect of the invention, there is disclosed a device readable medium having stored therein a plurality of programming instructions, which when executed by a wireless input device, the instructions cause the wireless input device to receive control signals from a processor-based device. The wireless input device comprises a transducer and a transceiver. The transducer is operable for generating instruction data. The transceiver transmits the instruction data as instruction signals for reception by the processor-based device. The instruction signals have a signal strength in which the signal strength determines the transmission range of the instruction signals. The transceiver further receives the control signals from the processor-based device. The signal strength and consequently the transmission range of the instruction signals are controllable based on control data contained in the received control signals. Further, the signal strength of the instruction signals is controlled by controlling rate of power consumption from a battery module and the battery module powers the transceiver.

In accordance with a fourth aspect of the invention, there is disclosed a device readable medium having stored therein a plurality of programming instructions, which when executed by a processor-based device, the instructions cause the processor-based device to transmit control signals to a wireless input device. The wireless input device comprises a transducer and a transceiver. The transducer is operable for generating instruction data. The transceiver transmits the instruction data as instruction signals for reception by the processor-based device. The instruction signals have a signal strength in which the signal strength determines the transmission range of the instruction signals. The transceiver further receives the control signals from the processor-based device. The signal strength and consequently the transmission range of the instruction signals are controllable based on control data contained in the received control signals. Further, the signal strength of the instruction signals is controlled by controlling rate of power consumption from a battery module and the battery module powers the transceiver.

BRIEF DESCRIPTION OF THE DRAWINGS

Embodiments of the invention are disclosed hereinafter with reference to the drawings, in which.

DETAILED DESCRIPTION

Figure 1:
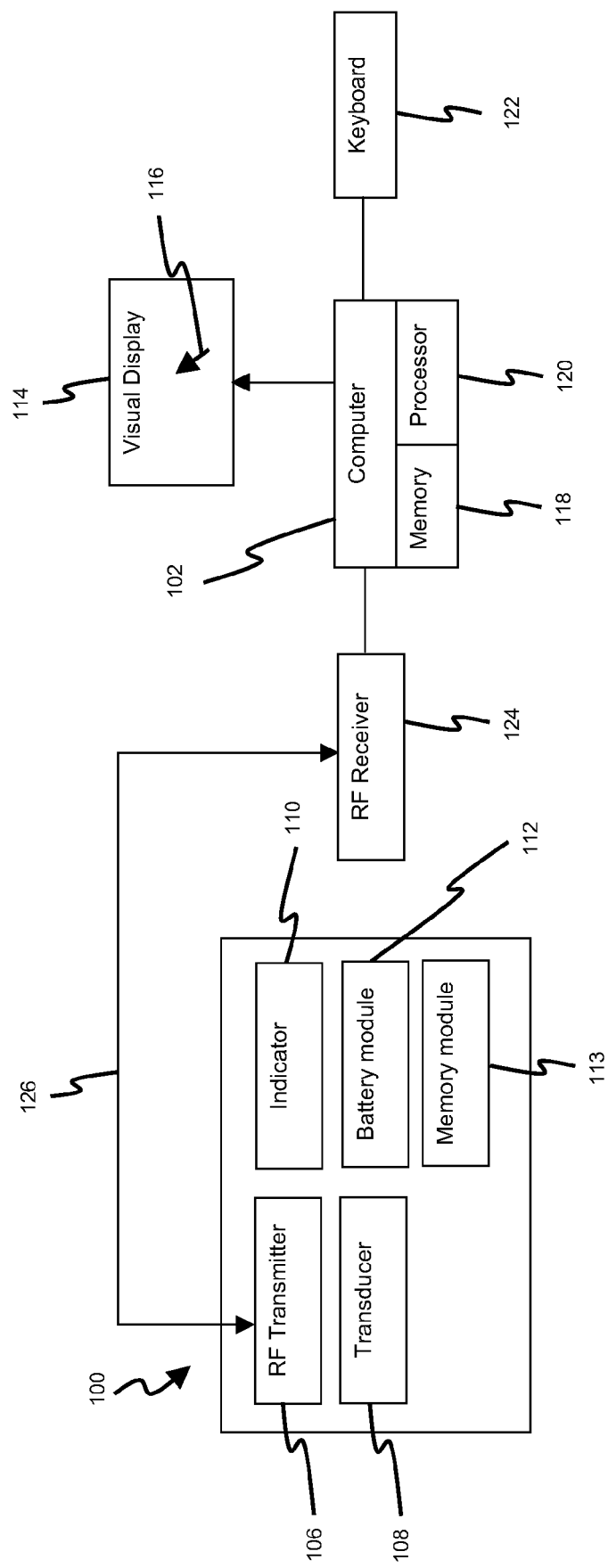
FIG. 1 is a schematic representation of a wireless input device in accordance with a first embodiment of the present invention.

An apparatus and a method for managing power usage of wireless input devices are described hereinafter for addressing the foregoing problems.

For purposes of brevity and clarity, the description of the invention is limited hereinafter to applications related to power usage management of wireless input devices. This however does not preclude various embodiments of the invention from other applications that require similar operating performance. The fundamental operational and functional principles of the embodiments of the invention are common throughout the various embodiments.

Exemplary embodiments of the invention described hereinafter are in accordance with FIGS. 1 to 4 of the drawings, in which like elements are numbered with like reference numerals.

FIG. 1 shows a schematic representation of a wireless input device 100 in accordance with a first embodiment of the present invention. The wireless input device 100 is preferably a wireless computer mouse for use in conjunction with a computer 102. When implemented as a wireless computer mouse, the wireless input device 100 comprises both primary and secondary keys (not shown). The primary and secondary keys are operable by a user. Yet additionally, the wireless input device 100 also comprises a radio-frequency (RF) transmitter 106, a transducer 108 and an indicator 110. Furthermore, since the wireless input device 100 does not receive power through a cord that typically connects a wired computer mouse to the computer 102, usage of a battery module 112 integrated with the wireless input device 100 is necessary in order to provide power for operating the wireless input device 100. Batteries used for the battery module 112 are preferably either disposable batteries or rechargeable batteries such as AA-size batteries. The wireless input device 100 further comprises a memory module 113 for storing any miscellaneous profile settings of the wireless input device 100. The memory module 113 is preferably a semiconductor memory device such as static random access memory (SRAM) or flash memory.

The computer 102 preferably comprises a visual display device 114. The visual display device 114, which may be a cathode ray tube-type, active matrix display-type or other suitable device, can display a cursor (or a pointer) 116, along with text and other graphical information. The computer 102 further comprises memory 118, a processor 120 and a keyboard 122. A RF receiver 124 is also coupled to the computer 102, and used in conjunction with the wireless input device 100. Specifically, the RF transmitter 106 wirelessly communicates with the RF receiver 124 through a wireless communication link 126 established between the RF transmitter 106 and the RF receiver 124. The communication link 126 is preferably established using a communication protocol such as Bluetooth, wireless universal-serial-bus (WUSB) or the like. Hence, the wireless input device 100 is then able to communicate with the computer 102 in the absence of the cord, which is used conventionally by the wired computer mouse for communicating with the computer 102.

Figure 2:
FIG. 2 shows a graphical format of a software application used for configuring the wireless input device of FIG. 1.

A software application 200, as shown in FIG. 2, is provided to the user for varying rate of power consumption of the battery module 112 to thereby vary between a power conservation state and an increased transmission range state. When options provided in the software application 200 are adjusted by the user for operating the wireless input device 100 in the increased transmission range state, the rate of power consumption increases which in turn increases the signal transmission range (hereinafter transmission range) but hasten the depletion of power from the battery module 112. Conversely, when the options provided in the software application 200 are adjusted by the user for operating the wireless input device 100 in the power conservation state, the rate of power consumption decreases, which in turn slows down the depletion of power from the battery module 112 but decreases the transmission range. The rate of depletion of power from the battery module 112 determines the life of the battery module 112. Therefore, the life of the battery module 112 and the transmission range have an inversely proportional relationship. In addition, the transmission range shares a directly proportional relationship with the signal strength of the transmitted signals.

Figure 3:
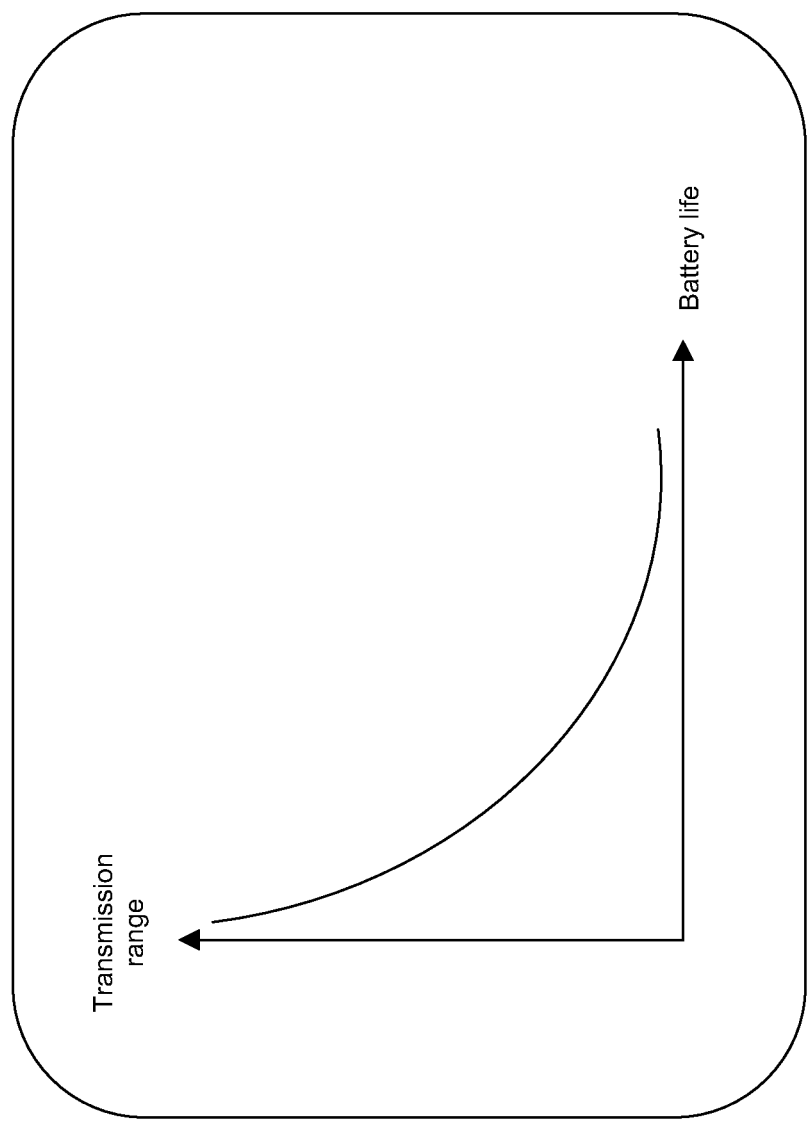
FIG. 3 is a graph depicting the inversely proportional relationship between transmission range and battery life.
Figure 3:

The RF transmitter 106 comprises a controller (not shown) for modulating instruction data received by the RF transmitter 106 into instruction signals. A transceiver may alternatively be used to replace the RF transmitter 106 such that the wireless input device 100 possesses both signal transmitting and receiving capabilities. Typically, the transceiver also comprises the controller for modulating instruction data into instruction signals for transmission thereof. The RF transmitter 106 is for transmitting the instruction signals for reception by the RF receiver 124. When the user adjusts the options provided in the software application 200, rate of power consumption of the controller is varied. FIG. 3 shows a graph 300 depicting the inversely proportional relationship between the life of the battery module 112 and the transmission range. In addition, a free-space-propagation model governs the relationship between the power at the RF transmitter 106 and the RF receiver 124. The free-space-propagation model is known as the Friis equation, which is expressed as:

$$P_R(d) = \frac{P_T G_T G_R \lambda^2}{(4\pi)^2 d^2} \qquad (1)$$

where $P_T$ is the transmitted power at the transmitter, $P_R(d)$ is the received power at the receiver, $G_T$ is the transmitter-antenna gain, $G_R$ is the receiver-antenna gain, d is the transmitter-to-receiver separation distance, and $\lambda$ is the wavelength.

The Friis equation shows that the received power "falls off" as the square of the transmitter-to-receiver separation distance. The result implies that the received power decays with distance at a rate of 20 dB/decade. Hence, increasing the transmission range requires more power for farther transmission of signals and hence the rate of power consumption by the controller is higher, leading to increased usage of the battery power from the battery module 112. Conversely, a decreased usage of battery power by the controller from the battery module 112 can be obtained by decreasing the transmission range since lesser electrical power is required for short distance transmission.

To vary the rate of power consumption by the controller, the user adjusts the options in the software application 200, which allows dynamic alteration of the transmission range of the RF transmitter 106 based on the user's selection. One or more of the rate of power consumption, the estimated transmission range and the corresponding estimated life of the battery module 112 even during and after adjustment by the user are displayable by the indicator 110. The indicator 110 is preferably a plurality of light-emitting diodes (LEDs) formed on the body of the wireless input device 100.

When a user depresses or "clicks" either the primary key or secondary key of the wireless input device 100, a switching function is executed. Specifically, depressing either one of the primary key or secondary key changes an associated switch state and generates a switching signal that is communicated by the RF transmitter 106 to the computer 102 via the RF receiver 124. In addition, displacement of the wireless input device 100 relative to a surface is detected and transduced by the transducer 108 into positional signals. The transducer 108 is typically disposed within the wireless input device 100. Furthermore, the transducer 108 is preferably either an optical sensor or a laser sensor. The positional signals are then communicated by the RF transmitter 106 to the computer 102 via the RF receiver 124 for effecting changes on the visual display device 114, such as text scrolling or moving the cursor 116.

The software application 200, when executed by the processor 120 of the computer 102 provides the user with the following options: an adjust-rate-of-power-consumption option, a remaining-battery-life indicator, an adjust-transmission-range option and a current-transmission-range indicator respectively. The adjust-rate-of-power-consumption option provides a slider for the user to specify the desired rate of power consumption for the wireless input device 100. The adjust-transmission-range option also provides the user with a slider to specify if an increased or decreased transmission range is desired.

The remaining-battery-life indicator displays an estimated amount of remaining life of the battery module 112 based on the settings defined in the adjust-rate-of-power-consumption option and the adjust-transmission-range option. On the other hand, the current estimated transmission range of the wireless input device 100 is then displayed in the current-transmission-range indicator. Furthermore, adjustment made to settings for either the adjust-rate-of-power-consumption option or the adjust-transmission-range option automatically triggers the software application 200 to adjust the settings defined in other options accordingly since the life of the battery module 112 and the transmission range share an inversely proportional relationship. In addition, the remaining-battery-life indicator and the current-transmission-range indicator will also automatically be adjusted accordingly.

The various settings as defined by the user in the adjust-rate-of-power-consumption option and the adjust-transmission-range option are then converted into data by the computer 102 and transmitted as control signals to the wireless input device 100. Upon receiving the control signals, the control signals are then decoded by the wireless input device 100 for obtaining the data contained in the control signals. The obtained data are then used by the wireless input device 100 for adjusting the power conservation state and the increased transmission range state as stipulated by the user using the software application 200. In addition, an "operating" profile containing the obtained data is created and stored in the memory module 113. The "operating" profile is retrievable from the memory module 113 by the wireless input device 100 and the settings defined in the "operating" profile is applicable for use by the wireless input device 100 whenever the wireless input device 100 is used in conjunction with any computers.

Figure 4:
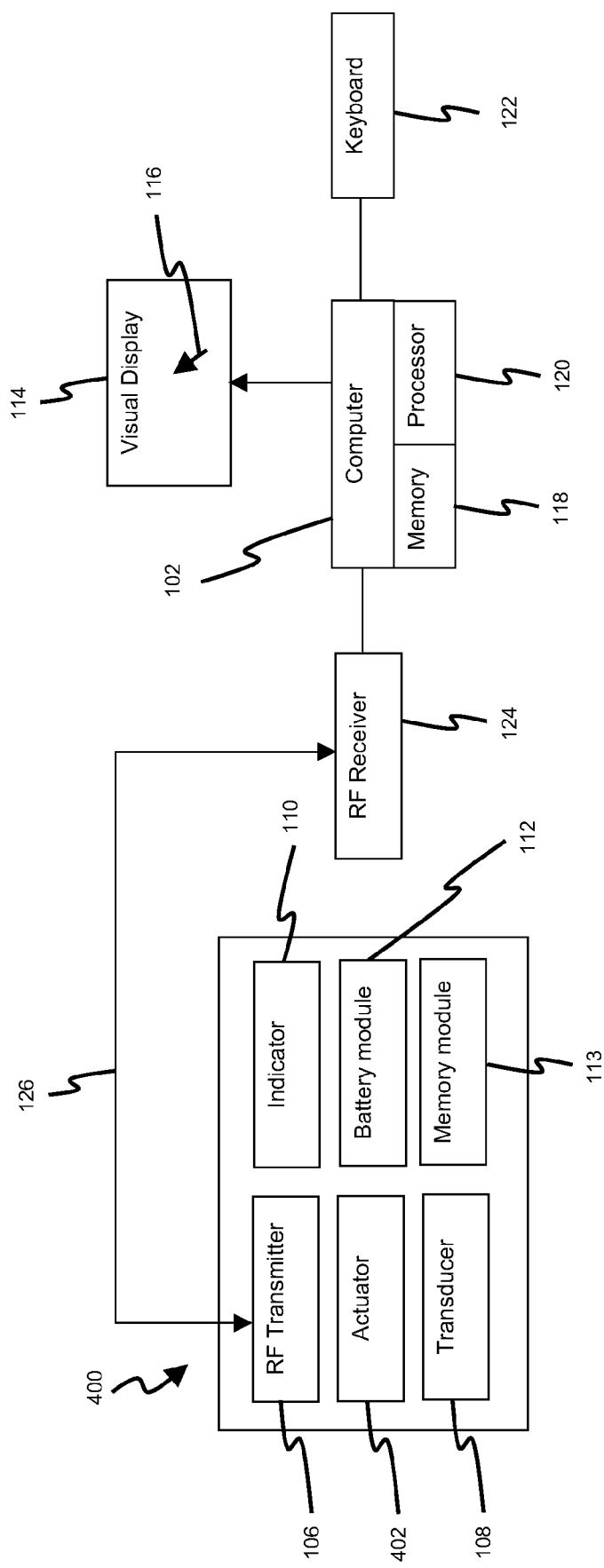
FIG. 4 is a schematic representation of a wireless input device in accordance with a second embodiment of the present invention.

Alternatively, according to a second embodiment of the present invention as shown in FIG. 4, a wireless input device 400 similar to the wireless input device 100 of FIG. 1 is implementable. The wireless input device 400 of FIG. 4 comprises an actuator 402 in addition to all the features as described previously for the wireless input device 100 of FIG. 1. The actuator 402 allows the user to vary rate of power consumption of the battery module 112 to thereby vary between a power conservation state and an increased transmission range state. When the actuator 402 is operated towards the increased transmission range state, the rate of power consumption increases which in turn increases the transmission range but hasten the depletion of power from the battery module 112. When the actuator 402 is operated towards the power conservation state, the rate of power consumption decreases, which in turn slows down the depletion of power from the battery module 112 but decreases the transmission range. The rate of depletion of power from the battery module 112 determines the life of the battery module 112. As aforementioned, the relationship of the life of the battery module 112 and the transmission range is inversely proportional to each other.

To vary the rate of power consumption by the controller, the user operates the actuator 402, which allows dynamic alteration of the transmission range of the RF transmitter 106 based on the user's selection. The actuator 402 is preferably one of a single button, a slider, a switch and a tactile sensor. The tactile sensor is either a capacitive sensor or a resistive sensor. One or more of the rate of power consumption, the estimated transmission range and the corresponding estimated life of the battery module 112 after adjustment by the user are then displayable by the indicator 110. Further, an "operating" profile corresponding to a particular desired combination of the transmission range and the rate of power consumption as selected by the user is then created and stored in the memory module 113. The "operating" profile is retrievable from the memory module 113 by the wireless input device 400 and the settings defined in the "operating" profile is applicable for use by the wireless input device 400 whenever the wireless input device 400 is used in conjunction with any computers.

Yet alternatively, the software application 200 is also usable for adjusting the settings of the wireless input device 400 for varying the increased transmission range state and the power conservation state. Hence, as opposed to using the actuator 402, adjustment of the rate of power consumption of controller of the wireless input device 400 of FIG. 4 is performable by using the software application 200 instead. The manner of usage of the software application 200 to the wireless input device 400 of FIG. 4 is similar as to the wireless input device 100 of FIG. 1 as aforementioned.

Further, the wireless input device 100 of FIG. 1 and the wireless input device 400 of FIG. 4 may optionally perform data transmission using the frame bursting transmission technique. Under the frame bursting transmission technique, data transmission is performed in a series of burst transmissions as opposed to the typical continuous transmission. Each of the burst transmission is preferably performed within a specified duration and at a specified frequency. Consequently, the rate of power consumption from the battery module 112 is further determinable by at least one of the specified duration and the specified frequency of the data transmission performed using the frame bursting transmission technique.

The user is able to adjust advanced settings for additional features providable by the wireless input device 100 of FIG. 1 and the wireless input device 400 of FIG. 4 in order to optimize the rate of power consumption of the battery module 112 by the controller during transmission of data. The adjustable advanced settings include frequency of the burst transmission, duration of the burst transmission, required signal strength of the burst transmission and the like. Additionally, the user is also able to perform adjustment of the advanced settings through further options provided by the software application 200.

Furthermore, the wireless input device 100 of FIG. 1 and the wireless input device 400 of FIG. 4 may optionally provide other advanced techniques for improving the efficiency of data transmission. By improving the efficiency of data transmission, the rate of power consumption of the battery module 112 by the controller is then optimizable. The advanced techniques include data compression, data frames concatenation and the like.

In the foregoing manner, an apparatus and a method for managing power usage of wireless input devices are described according to embodiments of the invention for addressing at least one of the foregoing disadvantages. Although a few embodiments of the invention are disclosed, it will be apparent to one skilled in the art in view of this disclosure that numerous changes and/or modification can be made without departing from the spirit and scope of the invention.

What is claimed:

1. A wireless input device communicable with a processor-based device, the wireless input device comprising:
   a transducer operable for generating instruction data;
   a transceiver for transmitting the instruction data as instruction signals for reception by the processor-based device, the instruction signals having a transmission technique determining how the instruction signals are transmitted from the transceiver to the processor-based device, the transceiver further for receiving control signals from the processor-based device;
   a controller for controlling the power consumption of a battery module;
   an actuator coupled to the controller, the actuator configured to enable user selection between a first power consumption mode that is associated with a lower power consumption of the battery module and a second power consumption mode that is associated with a higher power consumption of the battery module, instruction signals transmissible from the wireless input device to the processor-based device at each of the first and second power consumption modes; and
   a software application for varying a rate of power consumption of the battery module independently of the actuator by selecting a transmission technique of the instruction signals, the transmission technique selected from any one of a continuous transmission, a frame bursting transmission, a data compression transmission, and a data frame concatenation transmission, the software application further dynamically adjusting the rate of power consumption in accordance with a plurality of user-defined options related to the instruction signals, comprising a transmission signal strength and a transmission range;
   wherein any of a selection of a transmission mode and an adjustment to a setting of one of the plurality of user-defined options automatically activates the software application to send corresponding control signals to the controller for dynamically adjusting the power consumption of the battery module.

2. The wireless input device as in claim 1, wherein the received control signals comprise control data that is generated based on and in response to a function on the processor-based device being operatively manipulated.

3. The wireless input device as in claim 2, wherein the function on the processor-based device is operatively manipulated by the instruction data contained in the instruction signals.

4. The wireless input device as in claim 1, wherein the battery module is carried by the wireless input device, the life of the battery module being inversely proportional with the transmission range of the instruction signals.

5. The wireless input device as in claim 4, further comprising:
   a body for housing the battery module, the transducer and the transceiver, the body having a base for being supported on a surface when in use and a support surface outwardly opposing the base.

6. The wireless input device as in claim 5, wherein the transducer is formed on the base of the body of the wireless input device.

7. The wireless input device as in claim 5, further comprising:
   a display formed on the support surface of the wireless input device for indicating at least one of the rate of power consumption of the battery module and the transmission range of the instruction signals.

8. The wireless input device as in claim 1, wherein the actuator is one of a slider and a tactile sensor.

9. The wireless input device as in claim 8, wherein the tactile sensor is one of a capacitive sensor and a resistive sensor.

10. The wireless input device as in claim 1, wherein the instruction signals are transmitted from the transceiver to the processor-based device using the frame bursting transmission technique.

11. A wireless input device as in claim 1, the user-defined options further comprising a transmission frequency and a transmission burst duration.

12. A power usage management method for a wireless input device communicable with a processor-based device, the method comprising:
   receiving control signals from the processor-based device with the wireless input device;
   generating instruction data with a transducer;
   transmitting, with a transceiver, the instruction data as instruction signals for the processor-based device, the instruction signals having a transmission technique determining how the instruction signals are transmitted from the transceiver to the processor-based device;
   receiving, with the transceiver, the control signals from the processor-based device;
   controlling, with a controller, the power consumption of a battery module;
   varying, with an actuator coupled to the controller, the rate of power consumption from the battery module, the actuator configured to enable user selection between a first power consumption mode that is associated with a lower power consumption of the battery module and a second power consumption mode that is associated with a higher power consumption of the battery module, instruction signals transmissible from the wireless input device to the processor-based device at each of the first and second power consumption modes;

varying, with a software application, a rate of power consumption of the battery module independently of the actuator comprising:
    selecting a transmission technique of the instruction signals, the transmission technique selected from an one of a continuous transmission, a frame bursting transmission, a data compression transmission, and a data frame concatenation transmission; and
    dynamically adjusting the rate of power consumption in accordance with a plurality of user-defined options related to the instruction signals, comprising a transmission signal strength and a transmission range;
automatically activating the software application upon any of a selection of a transmission technique and an adjustment to a setting of one of the plurality of user-defined options to send corresponding control signals to the controller for dynamically adjusting the power consumption of the battery module.

13. The method as in claim 12, wherein the received control signals comprise control data that is generated based on and in response to a function on the processor-based device being operatively manipulated.

14. The method as in claim 13, wherein transmitting the instruction signals from the transceiver to the processor-based device comprises:
    operatively manipulating the function on the processor-based device by the instruction data contained in the instruction signals.

15. The method as in claim 12, wherein the battery module is carried by the wireless input device, the life span of the battery module being inversely proportional with the transmission range of the instruction signals.

16. The method as in claim 12, wherein the wireless input device further comprises:
    a body for housing the battery module, the transducer and the transceiver, the body having a base for being supported on a surface when in use and a support surface outwardly opposing the base.

17. The method as in claim 16, wherein the transducer is formed on the base of the body of the wireless input device.

18. The method as in claim 16, wherein the wireless input device further comprises:
    a display formed on the support surface of the wireless input device for indicating at least one of the rate of power consumption of the battery module and the transmission range of the instruction signals.

19. The method as in claim 12, wherein the actuator is one of a slider and a tactile sensor.

20. The method as in claim 19, wherein the tactile sensor is one of a capacitive sensor and a resistive sensor.

21. The method as in claim 12, wherein the instruction signals are transmitted using the frame bursting transmission technique.

22. A power usage management method as in claim 12, the user-defined options further comprising a transmission frequency and a transmission burst duration.

23. A non-transitory computer readable medium having stored therein a plurality of programming instructions, which when executed by a wireless input device, the instructions cause the wireless input device to:
    receive control signals from a processor-based device;
    generate instruction data with a transducer;
    transmit the instruction data with a transceiver as instruction signals for reception by the processor-based device, the instruction signals having a transmission technique determining how the instruction signals are transmitted from the transceiver to the processor-based device;
    receive, with the transceiver, the control signals from the processor-based device;
    control, with a controller, the power consumption of a battery module;
    varying, with an actuator coupled to the controller, the rate of power consumption from the battery module the actuator configured to enable user selection between a first power consumption mode that is associated with a lower power consumption of the battery module and a second power consumption mode that is associated with a higher power consumption of the battery module, instruction signals transmissible from the wireless input device to the processor-based device at each of the first and second power consumption modes;
    wherein the programming instructions comprise a software application for varying a rate of power consumption of the battery module independently of the actuator by selecting a transmission technique of the instruction signals, the transmission technique selected from an one of a continuous transmission, a frame bursting transmission, a data compression transmission, and a data frame concatenation transmission, the software application further dynamically adjusting a rate of power consumption in accordance with a plurality of user-defined options related to the instruction signals, comprising a transmission signal strength and a transmission range;
    wherein the wireless input device is communicatively linked with the processor based device,
    wherein any of a selection of a transmission mode and an adjustment to a setting of one of the plurality of user-defined options automatically activates the software application to send corresponding control signals to the controller for dynamically adjusting the power consumption of the battery module.

24. The non-transitory computer readable medium as in claim 23, wherein control data is generated in response to a function on the processor-based device being operatively manipulated.

25. The non-transitory computer readable medium as in claim 24, wherein instruction signals are transmitted to the processor-based device by operatively manipulating the function on the processor-based device by instruction data contained in the instruction signals.

26. The non-transitory computer readable medium as in claim 23, wherein a battery module is carried by the wireless input device, the life of the battery module being inversely proportional with the transmission range of the instruction signals.

27. The non-transitory computer readable medium as in claim 23, wherein the wireless input device further comprises:
    a body for housing the battery module, a transducer and a transceiver, the body having a base for being supported on a surface when in use and a support surface outwardly opposing the base.

28. The non-transitory computer readable medium as in claim 27, wherein the transducer is formed on the base of the body of the wireless input device.

29. The non-transitory computer readable medium as in claim 27, wherein the wireless input device further comprises:
    a display formed on the support surface of the wireless input device for indicating at least one of the rate of power consumption of the battery module and the transmission range of the instruction signals.

30. The non-transitory computer readable medium as in claim 23, wherein the actuator is one of a slider and a tactile sensor.

31. The non-transitory computer readable medium as in claim 30, wherein the tactile sensor is one of a capacitive sensor and a resistive sensor.

32. The non-transitory computer readable medium as in claim 23, wherein the instruction signals are transmitted using the frame bursting transmission technique.

33. A non-transitory computer readable medium as in claim 23, the user-defined options further comprising a transmission frequency and a transmission burst duration.

34. A system comprising:
   a computer;
   an input device communicatively couplable to the computer for controlling a process performed on the computer, the input device comprising:
      a transducer operable for generating instruction data;
      a transceiver for transmitting the instruction data as instruction signals for reception by the computer, the instruction signals having a transmission technique determining how the instruction signals are transmitted from the transceiver to the computer, the transceiver further for receiving control signals from the computer;
      a controller for controlling the power consumption of a battery module; and
      an actuator coupled to the controller, the actuator configured to enable user selection between a first power consumption mode that is associated with a lower power consumption of the battery module and a second power consumption mode that is associated with a higher power consumption of the battery module, instruction signals transmissible from the input device to the computer at each of the first and second power consumption modes;
   wherein the computer comprises a software application for varying a rate of power consumption of the battery module independently of the actuator by selecting a transmission technique of the instruction signals, the transmission technique selected from am one of a continuous transmission, a frame bursting transmission, a data compression transmission, and a data frame concatenation transmission, the software application further dynamically adjusting the rate of power consumption in accordance with a plurality of user-defined options related to the instruction signals, comprising a transmission signal strength and a transmission range;
   wherein any of a selection of a transmission mode and an adjustment to a setting of one of the plurality of user-defined options automatically activates the software application to send corresponding control signals to the controller for dynamically adjusting the power consumption of the batter module.

* * * * *